United States Patent [19]
Coughlin et al.

[11] 3,720,321
[45] March 13, 1973

[54] RADIATION CROSSLINKED, SWELLED SEMIPERMEABLE MEMBRANES

[75] Inventors: Robert W. Coughlin, Bethlehem, Pa.; Richard D. Siegel, Waltham, Mass.

[73] Assignee: Research Corporation, New York, N.Y.

[22] Filed: March 11, 1970

[21] Appl. No.: 18,705

[52] U.S. Cl. ........210/500, 204/159.14, 204/159.19, 204/159.2, 204/160.1, 260/666 R, 260/674 R, 260/704
[51] Int. Cl...........B07b 1/00, C08d 1/00, C08f 1/16
[58] Field of Search.........204/159.14, 159.2, 159.19; 210/500

[56] References Cited

UNITED STATES PATENTS

| | | | |
|---|---|---|---|
| 3,101,275 | 8/1963 | Cairns et al. | 204/159.17 |
| 3,414,498 | 12/1968 | Shinohara et al. | 204/159.2 |
| 3,360,448 | 12/1967 | Schneider et al. | 204/159.19 |

Primary Examiner—Murray Tillman
Assistant Examiner—Richard B. Turer
Attorney—Oblon, Fisher & Spivak

[57] ABSTRACT

A semipermeable membrane of enhanced permeability or permselectivity which is formed by swelling a cross-linkable polymer film in a non-reactive, non-polymerizable swelling agent for a time sufficient to uniformly penetrate and swell the film, and thereafter subjecting the swollen film to high-energy ionizing radiation for a period of time and at a dose rate sufficient to cause cross-linking of the polymer.

4 Claims, No Drawings

RADIATION CROSSLINKED, SWELLED SEMIPERMEABLE MEMBRANES

BACKGROUND OF THE INVENTION

1. Field of Invention

This invention relates generally to a semipermeable polymeric membrane which is characterized by a very high degree of permselectivity and a very high degree of permeability, and to a technique for improving the permselectivity and permeability of a polymeric membrane by swelling the membrane with a suitable swelling agent and subjecting the swollen membrane to the action of high-energy ionizing radiation.

2. Description of Prior Art

Semipermeable membranes are increasingly being used in a variety of industries for separating selected components from liquid-liquid, gas-liquid, solid-liquid or gas-gas mixtures. In many instances, separation by the use of a semipermeable membrane can replace distillation techniques, especially where the component forms azeotropic mixtures or where the boiling points of the components make distillation very difficult or very costly. For example, semipermeable membranes can be used for such diverse purposes as separating organic liquids, such as p-xylene from o- and m-xylene; separating fresh water from river water or brackish water; and for separating organic impurities from industrial water streams to prevent pollution. These materials are also being used for separating gases from gas-gas or gas-liquid mixtures, such as for gas analysis or gas recovery.

In recent years, significant attention has been given to methods of enhancing the permeability and permselectivity of semipermeable membranes, but none of the state of the art techniques have been entirely successful from the point of view of enhancing both permeability and permselectivity with the consequence that there are very few membranes available which are suitable for economically treating a large quantity of material with a high degree of selectivity. Such prior art methods include grafting a surface film onto an original membrane in order to increase permselectivity, esterifying hydroxyl groups of a cellulose membrane in order to enhance permeability, and adding a third component to a separation mixture in order to enhance permeability.

Recently, several types of polymer films, such as polyethylene or cellulose acetate, have been suggested as being particularly well suited for the preparation of semipermeable membranes, but the problem with the state of the art films has been that both their permselectivity and their permeability are undesirably low for many applications. To enhance these properties, it has been suggested in Baddour, et al., U.S. Pat. No. 3,299,157, to pretreat or solvent-anneal the membrane film at a temperature of up to 5° C higher than the use temperature. Baddour, et al. accomplishes this by swelling or solvating the membrane in a solvent whose molecular cross-sectional area approximates that of the component intended to be diffused or passed through the membrane. Although this technique does provide some degree of improvement in permeability and permselectivity, it has now been noted that the enhanced properties tend to be significantly diminished after extended periods of use, often within a few hours. While it is not altogether clear why this diminishing of permselectivity and permeability actually occurs, the phenomenon seems to be explainable on thermodynamic theory and on polymeric morphology. It is believed that the larger the crystallites in the polymer, the easier is the transport of a foreign molecule through the amorphous regions surrounding the crystallites. It is theorized that during the annealing or solvation period, the smaller crystallites of the polymer are dissolved and are regrown in larger form, thereby resulting in a more open-structured polymer through which transport can easily take place. When the film is used in a different environment, the larger crystallites may redissolve and reform into smaller structures, reducing the permeability of the film.

It would be desirable, therefore, to provide a technique whereby the crystallites can be "locked in" or prevented from redissolving, so that the improvement in permeability can be rendered more permanent and more constant even after a considerably period of use.

The prior art also indicates that high-energy ionizing radiation has been used to treat polymeric semipermeable membranes in order to cause a wide range of changes in characteristics and physical properties. In none of these prior art techniques, however, is there any indication that radiation bombardment will enhance permeability or permselectivity. In fact, in U.S. Pat. No. 2,897,092 to Miller, it is indicated that just the opposite effect will occur and that permeability and permselectivity of polyethylene film will either be reduced or unaffected by radiation bombardment. In the U.S. Pat. No. 2,984,623 to Lee, there is also an indication that high-energy ionizing radiation has no effect on the permeability of a polymeric film at a given temperature, but that radiation acts only to strengthen the film enabling its use at higher temperatures, thereby taking advantage of the higher rates of permeability at the higher temperatures. Until the present invention, there has been no disclosure that high-energy ionizing radiation can be used to enhance permeability or permselectivity of a polymeric membrane.

SUMMARY OF THE INVENTION

It is therefore an object of this invention to provide a technique of using high-energy ionizing radiation for enhancing the permeability and permselectivity of a polymeric element.

It is another object of this invention to provide a film of improved permeability and permselectivity wherein the improved properties are rendered relatively permanent and constant even after an extended period of use.

Another object of this invention is to provide a semipermeable film which can be used for separating selected components from a liquid-liquid, gas-liquid, solid-liquid or gas-gas mixture.

Still another object of this invention is to provide a technique for improving the permeability and permselectivity of polyethylene membranes.

These and other objects have now herein been attained by the technique of swelling or solvating the polymeric films in a swelling agent which is soluble in the film, which is generally non-reactive with the polymer and which will not polymerize under the effects of high-energy ionizing radiation, and thereafter subjecting the swollen film to high-energy ionizing radiation for a time sufficient to cause at least some degree of cross-linking of the polymer whereby the permeability and permselectivity of the film are improved.

DETAILED DESCRIPTION OF PREFERRED EMBODIMENTS

According to the present invention, a polymeric film is first annealed or treated with a swelling agent for a sufficient time to insure that the membrane is uniformly swollen. The film is then subjected, while in its swollen condition to high-energy ionizing radiation.

The swelling agent used in this invention can be the same as the component of the mixture intended to be separated, i.e., the permeant, although this is not a requirement and, if desired, a different swelling agent can be used. It is only necessary that the swelling agent be generally soluble in the polymeric film and that it be generally non-reactive with the film, even upon exposure to high-energy ionizing radiation. By the term "generally non-reactive," is meant that the swelling agent should be capable of being readily removed from the membrane following the radiation procedure without chemically affecting the polymer. For the purposes of the present description, those swelling agents, such as water, which "react" with the polymer to the extent that they form ordinary solvation type or hydrogen type bonds, are not considered to be "reactive" in the sense that they do not chemically alter the polymer and they can be easily removed following irradiation. The solvent should also be non-monomeric; which is to say, it should be non-polymerizable upon exposure to ionizing radiation and non-polymerizable within the process environment of the present invention. Selection of the specific swelling agent can be made upon two alternative bases with equally good results; following the theory that the solvent acts to dissolve the smaller crystallites of the polymer in order to regrow larger crystallites, the swelling agent can be selected such that the solubility of the swelling agent in the polymer is significantly large. Following the theory, however, that the swelling agent acts to "template" or replicate the membrane, it should be selected according to the molecular cross-sectional area of the component of the mixture intended to be separated as well as on the basis of solubility in the polymer. Where the component intended to be separated has the smallest molecular cross-sectional area of those components of the mixture, the solvent should have a similarly small cross-sectional area in order to maximize the selectivity of the membrane for that particular component. On the other hand, where the component intended to be separated is not characterized by the smallest molecular cross-sectional area in the mixture, the solvent should be selected so that its molecular cross-sectional area approximates that of the component to be separated.

The molecular cross-sectional area is determined by dividing the molecular volume of the ingredient by the maximum linear dimension of the molecule as determined from a Stuart and Briegleb molecular model.

A wide variety of liquid solvents can be used for this annealing procedure. Representative of those found to be operable include: toluene, cyclohexane, benzene, chlorobenzene, mesitylene, cumene, ethylbenzene, methylcyclohexane, tetrahydronaphthylene, decahydronaphthylene, xylene, isooctane, heptane, water, and mixtures thereof such as mixtures of cyclohexane and heptane.

The solvent need not necessarily be a liquid and where the membrane is intended to be used for separating a gaseous material from a liquid or gas mixture, the polymeric film can be swollen with a gas which is soluble in the film. For example, oxygen-swollen membranes can be used in heart-lung machines for producing oxygen-enriched air. These membranes might also be useful for surgical dressings which are permeable to oxygen but non-permeable to liquids and infectious organisms. Other uses might be for purifying air in enclosed vehicles such as space craft or submarines or even in extracting oxygen from water. A wide variety of other gases besides oxygen can also be used for the swelling of the membrane, such as methane, propane, ethane or any of the vapors of the aforementioned solvents. Also, mixtures of gases can be used such as mixtures of oxygen and water vapor.

Where the molecular cross-sectional area of the particular soluble gas approximates that of the component of a liquid-liquid mixture intended to be separated, the film can be swollen with a soluble gas and thereafter used for separating the liquid-liquid system.

The swelling can be effected at any temperature below that at which the polymeric film will be dissolved in the selected solvent to the extent that the film loses its structural integrity.

The film need only be treated for a period of time sufficient to absorb about 1 percent to 90 percent of the solvent based on the original weight of film and preferably for a time sufficient to permit equilibrium conditions to occur between the solvent bath and the film. The specific time requirement can be easily calculated approximately by dividing the square of the thickness of the film by the diffusivity, in order to insure uniform permeation of the swelling agent throughout the membrane. The polymeric film is then subjected to high-energy ionizing radiation for a period of time up to 500 hours and preferably between 1 hour and 24 hours, and at a dose rate of about $10^3$ rads per hour to $10^8$ rads per hour, and preferably between $10^4$ to $10^7$ rads per hour. The total dosage level should be sufficient to cause at least some degree of cross-linking of the polymer without causing substantial polymer degradation. A dosage level of between $10^4$ rads to $10^9$ rads, and preferably $10^5$ to $10^7$ rads, is usually satisfactory. Any of the conventional radiation means can be used, such as gamma rays from $Co^{60}$, spent fuel elements, $Cs^{137}$ or beta rays such as those produced by particle acceleration by a Van der Graaff accelerator, a resonant transformer, or a linear accelerator.

It is necessary that the radiation be applied to the polymeric film while the film is in its swollen condition. Where the film is in a dry condition containing little or no swelling agent, the radiation treatment will not result in any significant improvement in permeability or permselectivity and in many instances those properties may actually be diminished.

It is believed that radiation causes some degree of cross-linking of the polymeric chains thereby binding the chains into dense clusters. Large crystallites in the polymeric chain formed by the dissolution and recrystallization during the annealing or solvation procedure are "locked in" or fixed in the dense clusters so that they are not easily redissolved in the changed environment. As indicated above, it is theorized that the formation of the large crystallites in the polymeric chain during the solvation procedure permits easy transport of the foreign molecules through the surrounding amorphous regions. Where the films have been annealed, but not irradiated, it is suspected that the crystallites redissolve and become smaller during use of the membrane. Whereas much of the enhanced permeability and permselectivity is lost within a few hours of use of the annealed, non-irradiated membrane, where the film has been further treated by irradiation, the enhanced properties remain for periods exceeding 500 hours and are believed to be relatively permanent.

The polymeric film selected for use within the context of this invention may be any of the well-known film forming natural resins or synthetic polymers such as those polymers formed from one or more ethylenically unsaturated monomers such as the polyolefins, including polyethylene and polypropylene; the polyvinyl halides, such as polyvinyl chloride; polyvinylidene chloride, the acrylic polymers such as polymethyl methacrylate, polymethylacrylate; polystyrene, and polyvinyl alcohol; and copolymers thereof such as copolymers of vinyl chloride and vinylidene chloride and copolymers of vinyl chloride and methyl methacrylate.

The film should have a dry thickness of at least about 1 mil. to 1 inch. There is usually no appreciable change in film thickness as a result of the swelling and irradiation treatments.

One convenient technique for testing the results of applying this invention is to place the polymer film between two compartments containing the same liquid or gaseous medium. After about 48 hours equilibrium conditions between the swelling agent medium and the film is usually reached for thin films or membranes. To test the permeability of the film, whether before or after treatment by this invention, a small amount of tritium-labeled permeant can be introduced on one side of the membrane and its passage through the membrane can be measured using radioactivity-counting techniques.

One convenient technique for carrying out the procedures of this invention is to immerse the polymer films in the swelling solvent held at the desired temperature. After equilibrium conditions are established, the solvated films are subjected to high-energy ionizing radiation for the desired time period at the desired dose rate while still in contact with the swelling solvent or its vapors. When the film is intended to be used for separating an ingredient other than the solvent used for swelling the film, the film may be dried before use to avoid contamination by the swelling solvent.

Having generally described the invention, a further understanding can be obtained by reference to certain specific examples which are presented herein for purposes of illustration only are are not intended to be limiting in any manner.

EXAMPLES

The separation or organic materials from liquid-liquid mixtures was demonstrated using a polyethylene film membrane having a thickness of 5 mils. The solvent-swollen membranes were subjected to gamma rays from a $Co^{60}$ source at a dose rate of about $10^6$ rads per hour. Exposure periods of up to 24 hours were investigated. Toluene and cyclohexane were used as swelling solvents and the permeability and permselectivity were tested with toluene, cyclohexane and benzene. The experimental procedures and apparatus used to test the permeability of the membrane if further described in AIChE Journal 15 (2), 208 (1969) which is herein incorporated by reference.

The films were pre-soaked at 30° C and during the irradiation procedure the temperature fluctuated between 33° C and 38° C. The results of these procedures are shown in Table I.

TABLE I

| Example number | Permeant or solvent used in measuring permeability | Hours of radiation treatment at dose rate of about $10^6$ rads/hr. | Solvent used for swelling film | Permeation medium | Permeability (cm.$^2$/sec.×$10^7$) | Remarks |
|---|---|---|---|---|---|---|
| 1 | Toluene | 0 | | Cyclohexane | 6.28 | |
| 2 | do | 0 | | do | 6.17 | |
| 3 | do | 3 | Cyclohexane | do | 7.73 | Not dried between irradiation and permeation. |
| 4 | do | 0 | | Toluene | 4.14 | Preswollen in toluene, no irradiation. |
| 5 | do | 0 | | do | 4.87 | Preswollen in cyclohexane and dried before immersion in toluene for permeation studies. |
| 6 | do | 0 | | do | 4.81 | Preswollen in cyclohexane and dried before immersion in toluene for permeation studies. |
| 7 | do | 1 | Cyclohexane | do | 4.79 | |
| 8 | do | 1 | do | do | 5.31 | Rerun of film from 7 after soaking in toluene for 550 hrs. |
| 9 | do | 3 | do | do | 5.80 | |
| 10 | do | 3 | do | do | 5.16 | Rerun of film from 9 after soaking in toluene for 500 hrs. |
| 11 | do | 8 | do | do | 7.00 | |
| 12 | do | 24 | do | do | 7.91 | |
| 13 | do | 24 | do | do | 7.61 | Rerun of film from 12 after soaking in toluene for 520 hrs. |
| 14 | do | 0 | | do | 4.14 | |
| 15 | do | 3 | Toluene | do | 4.96 | Not dried between irradiation and permeation. |
| 16 | do | 3 | Air | do | 4.57 | Soaked in cyclohexane and dried before irradiation in air. |
| 17 | do | 3 | Air | do | 4.10 | Irradiation in air. |
| 18 | Benzene | 0 | | do | 5.45 | |
| 19 | do | 0 | | Benzene | 4.56 | |
| 20 | Toluene | 3 | Benzene | Toluene | 6.42 | Dried for 6 hours between irradiation treatment and permeability measurements. |
| 21 | Benzene | 3 | do | do | 6.71 | Dried for 6 hours between irradiation treatment and permeability measurements. |
| 22 | do | 3 | do | Benzene | 5.40 | Dried for 6 hours between irradiation treatment and permeability measurements. |
| 23 | do | 3 | Toluene | do | 6.17 | Dried for 6 hours between irradiation treatment and permeability measurements. |
| 24 | do | 3 | do | Toluene | 8.08 | Dried for 6 hours between irradiation treatment and permeability measurements. |

TABLE II

| Example number | Permeant or solvent used in measuring permeability | Hours of radiation treatment | Solvent used for swelling film | Permeation medium | Permeability, P (cm.²/sec.×10⁶) | Permeability of benzene/permeability of toluene |
|---|---|---|---|---|---|---|
| 1 | Benzene | 0 | | Toluene | 5.45 | 1.31 |
| 2 | Toluene | 0 | | do | 4.14 | |
| 3 | Benzene | 3 | Toluene | do | 8.08 | 1.63 |
| 4 | Toluene | 3 | do | do | 4.96 | |

N.B.: Brackets are used to show that these values are computed from these values: e.g. 5.45/4.14=1.31 plus 8.08/4.96=1.63.

As the results of Table I indicate, permeability is enchanced not only in comparison with a non-treated polyethylene film, but also with respect to the solvent-swollen membrane which has not been irradiated. Moreover, the enhanced permeability remains substantially constant even after periods of up to about 550 hours of use. It is also clear from Table II that perm-selectivity is substantially enhanced by the techniques of this invention.

Polymer films can also be cast from a solvent or swelling medium and thereafter irradiated with high-energy ionizing radiation before drying, while in a swollen condition. For example, hydroxyl-ethyl-cellulose film can be cast from a 6 to 8 percent solution of 7 percent NaOH in water onto a smooth plate, partially dried to form a self-sustaining film swollen with water, washed, irradiated for 3 hours at a dose rate of $10^6$ rads per hour and thereafter dried in an oven at 180° F.

Cellophane films and membranes can be formed by coagulation of a viscose solution whereby the viscose solution is extruded in the form of a sheet into an acidified aqueous bath. The hydrated film is then irradiated at a dose rate of about $10^6$ rads per hour and thereafter dried at a temperature of about 100° C.

Similarly, polystyrene or polyvinyl chloride film can be cast from a solution of methyl ethyl ketone, dioxane, tetrahydrofuran, or ethylene dichloride. Polyvinylidene chloride film can be cast from solutions of tetrahydrofuran; polyvinyl acetate films can be cast from water; cellulose acetate films can be cast from acetone; nylon can be cast from formic acid; or polyolefins can be cast from hot toluene. The cast films are then partially dried, irradiated, and then the solvents are removed by drying or otherwise.

The semipermeable membranes of the present invention can be used for a wide range of separation applications. For example, these membranes can be used for separating azeotropic or close boiling mixtures. They can also be used for removing water from a chemical reaction mixture in which water is a product of the reaction so as to shift the reaction equilibrium, or they can be used for dehydrating organic liquids. They further can be used for enriching an isobutane-butene alkylate in the gasoline boiling range, as well as for a variety of other liquid-liquid separation procedures. As indicated above, the membranes of the present invention can also be used for separating a gas from a gas-gas or gas-liquid mixture, for gas analysis or gas recovery. Where oxygen is a permeant, the membranes may find wide application in human breathing apparatus and the like.

The techniques of this invention can also be applied in preparing elements for chromatography and other types of separation apparatus; for the preparation of fuel cell barriers; and for the preparation of ion-exchange resin particles.

Having fully described the invention, it will be apparent to one having ordinary skill in the art that many modifications and changes can be made without departing from the spirit or scope thereof. For example, although this disclosure has primarily been in terms of enhancing the permeability of semipermeable membranes, the techniques of this invention can also be used to enhance the permeability and permselectivity of thicker elements such as more massive polymeric bodies, including ion exchange resin particles and the like where a gas or liquid is intended to be diffused through the material.

What is claimed and intended to be covered by letters patent is:

1. In a process for permeating an organic material from a liquid-liquid mixture through a semipermeable membrane, the improvement comprising using a membrane formed by the process of:

contacting a cross-linkable film of a polymeric material selected from the group consisting of polyolefin, polyvinyl halide, polyvinylidene halide, polyacrylate, polystyrene, polyvinyl alcohol, copolymers of vinyl chloride and vinylidene chloride, copolymers of vinyl chloride and methyl methacrylate, hydroxy ethyl cellulose, cellophane, polyvinyl acetate, cellulose acetate, and nylon, with a swelling agent which is generally non-reactive with said film, which is non-polymerizable under the process conditions, and which is sufficiently soluble in said film such that 1 to 90 percent of the swelling agent based on the unswollen weight of film is absorbed into the film to cause said swelling agent to uniformly penetrate and swell said film, and, subjecting said swollen film to high-energy ionizing radiation for a period of time and at a dost rate of between $10^3$ to $10^8$ rads/hour, to cause self-cross-linking of said polymeric film, in the absence of a polymerizable monomer, whereby the permeability or permselectivity of said film is increased.

2. The process of claim 15, wherein said swelling agent is a gaseous substance.

3. The process of claim 15, wherein a solution of a film-forming polymeric material is prepared with said swelling agent and wherein a film is cast from said solution, is partially dried, and then is subjected to said radiation treatment.

4. The process of claim 1 wherein said swelling agent is water.

* * * * *